United States Patent [19]
Ariga

[11] Patent Number: 5,119,780
[45] Date of Patent: Jun. 9, 1992

[54] STAGED DIRECT INJECTION DIESEL ENGINE

[75] Inventor: Susumu Ariga, San Antonio, Tex.

[73] Assignee: Southwest Research Institute, San Antonio, Tex.

[21] Appl. No.: 713,744

[22] Filed: Jun. 11, 1991

[51] Int. Cl.$^5$ .............................................. F02M 45/02
[52] U.S. Cl. .................................... 123/300; 123/431; 123/73 C
[58] Field of Search ............... 123/275, 276, 279, 299, 123/300, 301, 430, 431, 73 C

[56] References Cited

U.S. PATENT DOCUMENTS

| | | | |
|---|---|---|---|
| 2,221,405 | 11/1940 | Nallinger | 123/431 |
| 3,924,598 | 12/1975 | Davis | 123/299 X |
| 4,217,871 | 8/1980 | Ohashi et al. | 123/501 |
| 4,414,940 | 11/1983 | Loyd | 123/300 X |
| 4,520,774 | 6/1985 | Sitter | 123/300 |
| 4,543,930 | 10/1985 | Baker | 123/300 X |
| 4,572,133 | 2/1986 | Bago | 123/431 |
| 4,590,904 | 5/1986 | Wannenwetsch | 123/300 |
| 4,612,905 | 9/1986 | Dietrich et al. | 123/300 X |
| 4,831,982 | 5/1989 | Baranesch | 123/300 X |

OTHER PUBLICATIONS

"Single-Cylinder Axial Stratified Charging Studied", 1982 Society of Automotive Engineers, Inc., pp. 67-71, Apr. 1982.

Primary Examiner—Willis R. Wolfe
Attorney, Agent, or Firm—Baker & Botts

[57] ABSTRACT

Apparatus and method for operating a 2-stroke or 4-stroke reciprocating compression-ignition internal combustion engine, of the direct injection type, to reduce fuel consumption and to reduce $NO_x$ emissions. A staged fuel injection process involving two fuel injectors, but only one type of fuel, is used. A low pressure fuel injection device injects a pilot fuel charge into the combustion chamber when the combustion chamber is near its lowest pressure and its maximum volume. The pilot fuel charge stratifies within the combustion chamber, and undergoes a preflame reaction with a resultant release of heat energy. Near the end of the compression stroke of the piston, when the combustion chamber is near its minimum volume, a high pressure fuel injector injects a main fuel charge into the combustion chamber. The main fuel charge is ignited by the burning pilot fuel charge, and combustion of the main fuel charge is accelerated by the heat energy released by the pilot fuel charge preflame reaction. This accelerated combustion process reduces the ignition delay and premix combustion rate, and results in reduced fuel consumption and $NO_x$ emissions, without adversely affecting either combustion noise levels or particulate emission.

59 Claims, 3 Drawing Sheets

STAGED DIRECT INJECTION DIESEL ENGINE

TECHNICAL FIELD OF THE INVENTION

This invention generally relates to reciprocating compression-ignition internal combustion engines such as diesel engines, of the direct injection type, and, more particularly, is concerned with an improved method and apparatus for operating such engines, and to a reciprocating compression-ignition internal combustion engine which operates in accordance with this improved method and apparatus.

BACKGROUND OF THE INVENTION

A reciprocating compression-ignition internal combustion engine, otherwise known as a diesel engine, is well known. In the diesel engine, air is drawn into the combustion chamber during the induction stroke of the piston, and is compressed to a high compression ratio. As a result of this compression, the air in the combustion chamber is heated to a temperature higher than the ignition temperature of the diesel fuel. Diesel fuel is then injected into the combustion chamber. Because of the prevailing high temperature, the fuel ignites spontaneously. However, combustion does not take place immediately when the fuel particles enter the combustion chamber. The fuel droplets must first mix intimately with the air in the combustion chamber, and then be heated and vaporized before they can burn. The time lapse between fuel injection and ignition during which this process occurs is known as the "ignition delay" or "ignition lag".

Diesel engines, like spark-ignition engines, operate on either the four-stroke or the two-stroke principle. In a direct injection type diesel engine, the fuel is injected directly into the combustion chamber, rather than into a swirl chamber or a precombustion chamber, as with indirect injection diesel engines.

The ignitability of a diesel fuel is rated by its centane number (C.N.). The centane number of a diesel fuel is the percentage by volume of normal centane in a mixture of centane and alphamethylnaphthalene which matches the unknown fuel in ignition quality when compared in an ASTM-CFR diesel engine by a specified procedure. The C.N. scale ranges from 0 to 100 C.N. for fuels equivalent in ignition quality to alphamethylnaphthalene and centane, respectively. The higher the centane number of a fuel, the greater its ignitability in a diesel engine.

A two-phase combustion process takes place in the diesel engine. The first phase, called "premix combustion", is the spontaneous burning of the fuel first injected into the hot compressed air. As additional fuel is injected, it is ignited by the flame resulting from the premix combustion phase. This second phase is called "diffusion combustion".

Modern environmental concerns require that diesel engines operate with minimum fuel consumption, minimum noise levels, and minimum $NO_x$ and particulate emissions. All of these performance parameters are related to an engine's ignition delay. Both fuel consumption and particulate emissions can be minimized by increasing the ignition delay up to a certain point where the engine structure cannot tolerate the rapid pressure rise. However, as the ignition delay period increases, the premix combustion rate increases, and a greater quantity of premixed fuel is present in the combustion chamber when ignition occurs. The larger quantity of fuel being ignited increases combustion pressure, combustion noise level, and $NO_x$ emissions. Therefore, with existing diesel engine designs, a trade-off exists between reduction of fuel consumption and particulate emissions on one hand, and reduction of noise and $NO_x$ emissions on the other hand.

In recent years, several methods have been proposed for reducing diesel engine ignition delay and premix combustion rate. These methods include dual (or pilot) fuel injection, fumigation, vigom fuel injection and staged fuel injection. See *The Oil Engine and Gas Turbine*, New Developments by B.I.C.E.R.A. (Nov. 1953) (discussing dual or pilot fuel injection); E. F. Obert, *Internal Combustion Engines and Air Pollution* (Interet Educational Publisher 3d Ed. 1973) (discussing fumigation); Eyzat, et. al., *The Effect of the Vigom Process on the Combustion in Diesel Engines*, S.A.E. Paper (October, 1964) (discussing vigom fuel injection); and Baker, *Staged Direct Injection Diesel Engine*, U.S. Pat. No. 4,543,930 (discussing staged fuel injection). However, neither dual fuel injection, fumigation, nor vigom fuel injection have been successful in reducing premix combustion rate without sacrificing fuel consumption and exhaust emission characteristics. The staged fuel injection method, however, has been successful to a limited degree in accomplishing these objectives.

Consequently, a need exists for an improved method and apparatus for operating a diesel engine that will simultaneously reduce fuel consumption, combustion noise, and $NO_x$ and particulate emissions.

SUMMARY OF THE INVENTION

The present invention provides an apparatus and method for operating a reciprocating compression-ignition internal combustion engine which answers the aforementioned needs.

According to the invention, there is provided a reciprocating compression-ignition internal combustion engine with both a high pressure and a low pressure fuel injector for each combustion chamber in the engine. Both fuel injectors draw fuel from a common fuel tank. The low pressure fuel injector injects a pilot fuel charge into the combustion chamber when the combustion chamber is near its maximum volume. For a four-stroke engine, the low pressure pilot fuel charge is preferably injected through the intake valve inlet port during the latter part of the induction stroke of the piston and/or during the earlier part of the compression stroke. For a two-stroke engine, the low pressure pilot fuel charge is preferably injected through an opening in the cylinder block during the early part of the compression stroke in order to minimize a loss of fuel into the exhaust port during the scavenging process.

A second, high pressure fuel injector injects a main fuel charge into the combustion chamber when the combustion chamber is near its minimum volume, in the conventional manner of a direct injection compression-ignition engine. The pilot fuel charge quantity is preferably 5% to 10% of the main fuel charge quantity.

This invention provides for the combustion interaction of the pilot and main fuel charge injections. In the relatively low pressure environment into which it is injected in a timely manner, the pilot fuel charge stratifies near the cylinder head within the combustion chamber. During the ensuing compression stroke, the pilot fuel charge undergoes a preflame reaction with a resultant release of heat energy into the combustion chamber. The pilot fuel charge is ignited by the heat of compression, and combustion continues until the main fuel charge is injected into the combustion chamber. The main fuel charge is ignited by the burning pilot fuel charge. The heat energy released by the preflame reaction of the pilot fuel charge accelerates combustion of the main fuel charge, and thus reduces the ignition delay period and premix combustion rate for the main fuel charge.

Compared to previous methods for reducing ignition delay in a compression-ignition internal combustion engine, the present invention presents an improved method and apparatus for reducing combustion noise and $NO_x$ emission without an attendant increase in either fuel consumption or particulate emissions.

Other features and advantages of the invention will become apparent to those skilled in the art upon review of the following detailed description, claims and drawings.

BRIEF DESCRIPTION OF THE DRAWINGS

For a more complete understanding of the present invention, and the advantages thereof, reference is now made to the following Description of the Preferred Embodiment, taken in conjunction with the accompanying drawings, in which.

DETAILED DESCRIPTION OF THE INVENTION

Figure 1:
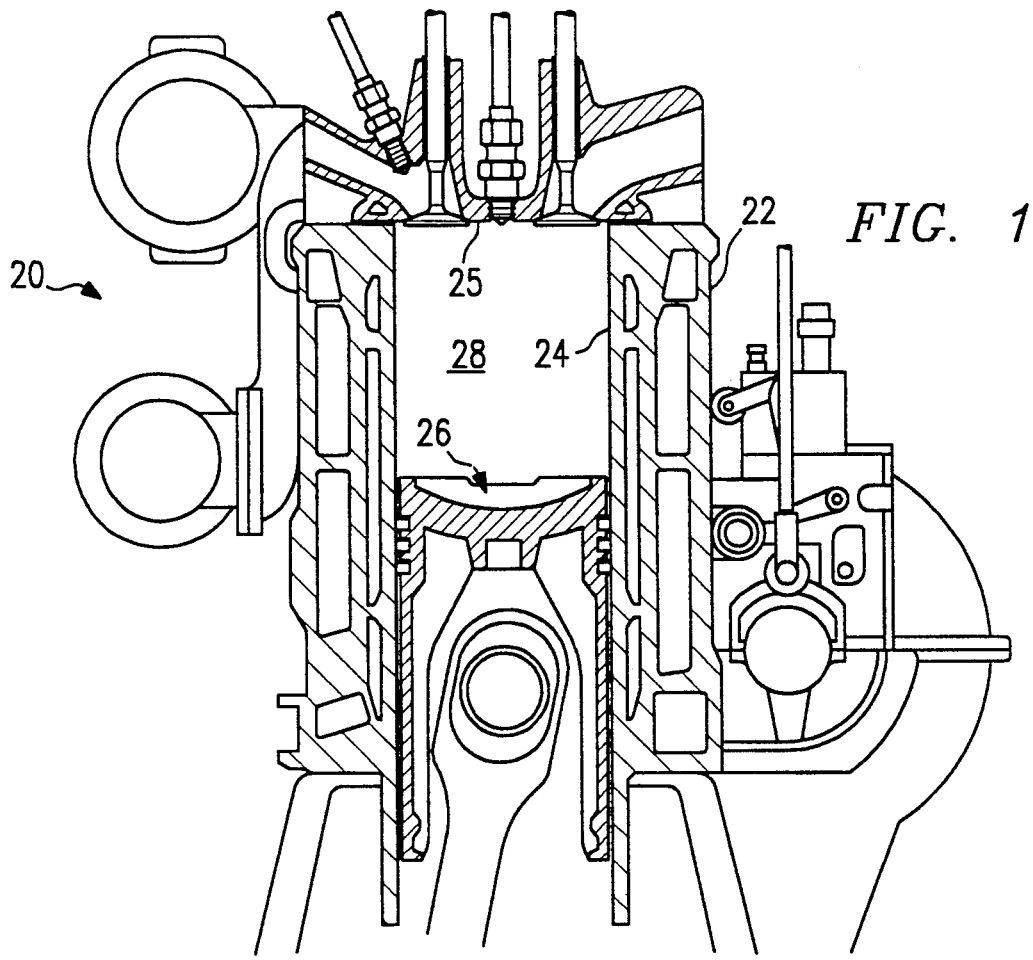
FIG. 1, is a side elevational view, partially in cross-section, of one embodiment of a reciprocating 4-stroke compression-ignition internal combustion engine conforming with the invention.

The preferred embodiment of the present invention and its advantages are best understood by referring to the drawings, like numerals being used for like and corresponding parts of the various drawings.

Figure 2:
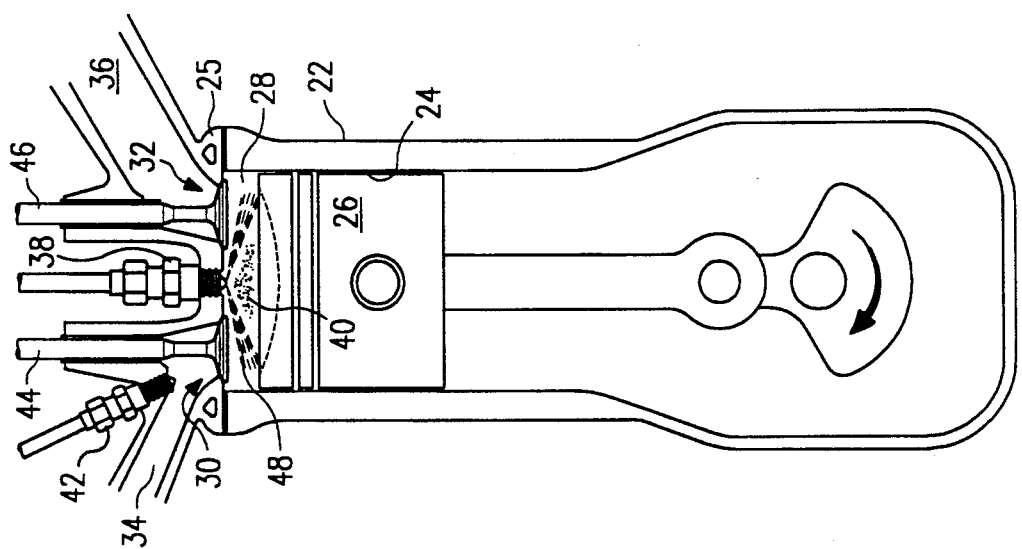
FIG. 2 is a side elevational view, partially in cross-section, of one cylinder and crankcase of the engine of FIG. 1 during the latter part of the induction stroke of the piston, showing injection of a low pressure pilot fuel charge through the open intake valve.

In FIG. 1 there is shown a reciprocating 4-stroke compression-ignition internal combustion engine, generally designated 20, which incorporates the preferred embodiment of the present invention. The engine 20 includes a cylinder block 22 having one or more bores 24 formed therein. A cylinder head 25 closes one end of each cylinder bore 24. A piston 26 is arranged in the cylinder bore 24 for reciprocatory movement therein. A combustion chamber 28 is enclosed by the piston 26, head 25 and cylinder block 22. Referring to FIG. 2, showing the engine cylinder in more detail, inlet port 30 and exhaust port 32 are formed in the cylinder head 25, and open into inlet duct 34 and exhaust duct 36, respectively. Inlet valve 44 and exhaust valve 46 are arranged in the head 25 for reciprocating movement therein, and by such movement open and close inlet port 30 and exhaust port 32, respectively.

A high pressure fuel injection nozzle 38 is mounted in the cylinder head 25 for timed injection of diesel fuel directly into the combustion chamber 28. A low pressure fuel injection nozzle 42 is also mounted in the cylinder head 25 and is positioned for timed injection of fuel into the combustion chamber 28 through the inlet port 30 when inlet valve 44 is in the open position. The high pressure fuel injection nozzle 38 is connected to a conventional high pressure fuel injection system (not shown). The low pressure fuel injection nozzle 42 is connected to a low pressure fuel injection system (not shown), such as an automotive type electronic fuel injector system. Both the high and the low pressure fuel injection systems draw fuel from a common fuel tank (not shown).

Figure 3:
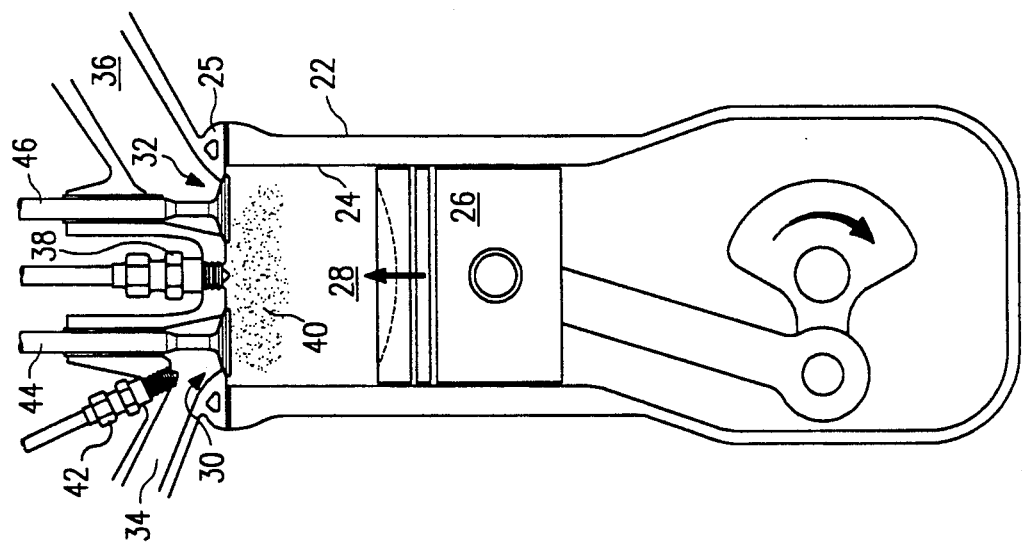
FIG. 3 is the cylinder and crankcase of FIG. 2 during the compression stroke of the piston, showing the pilot fuel charge stratified in the combustion chamber.

In operation, as shown in FIG. 2, a pilot fuel charge 40 is injected through the low pressure fuel injection nozzle 42 when the volume of the combustion chamber 28 is near its maximum. The pilot fuel injection can take place during the latter part of the induction stroke of the piston 26, during the early part of compression stroke, or both. As shown in FIG. 3, the pilot fuel charge 40 stratifies within the combustion chamber 28 near the cylinder head as a result of the timed injection. During the ensuing compression stroke of the piston 26, the increased pressure and temperature causes the pilot fuel charge 40 to undergo a preflame chemical and physical reaction. This preflame reaction releases heat energy into the combustion chamber 28.

The early timing of injection of the pilot fuel charge 40 to occur during the latter part of the induction stroke and/or the early part of the compression stroke, at the latest, is crucial. When pilot fuel is injected into the combustion chamber in the presence of air, the air-fuel ratio is heterogeneous rather than uniform. In a localized region of the pilot fuel plume, the air-fuel ratio will temporarily be at or near stoichiometric, i.e., chemically correct for combustion. If the pilot fuel charge 40 is injected too late in the compression stroke, as when the piston 26 is approaching top dead center position, the injected pilot fuel tends to progressively combust as a result of ignition in the localized stoichiometric air-fuel ratio region. Progressive combustion of the pilot fuel has the adverse effects of deteriorating thermal efficiency and increasing $NO_x$ emissions. However, if the pilot fuel charge 40 is injected no later than the early part of the compression stroke, the localized air fuel ratios are no longer near stoichiometric when high compression heat is generated during the latter part of the compression stroke. Therefore, progressive combustion of the pilot fuel with its adverse effects is avoided by the early injection timing in accordance with this invention.

Figure 4:
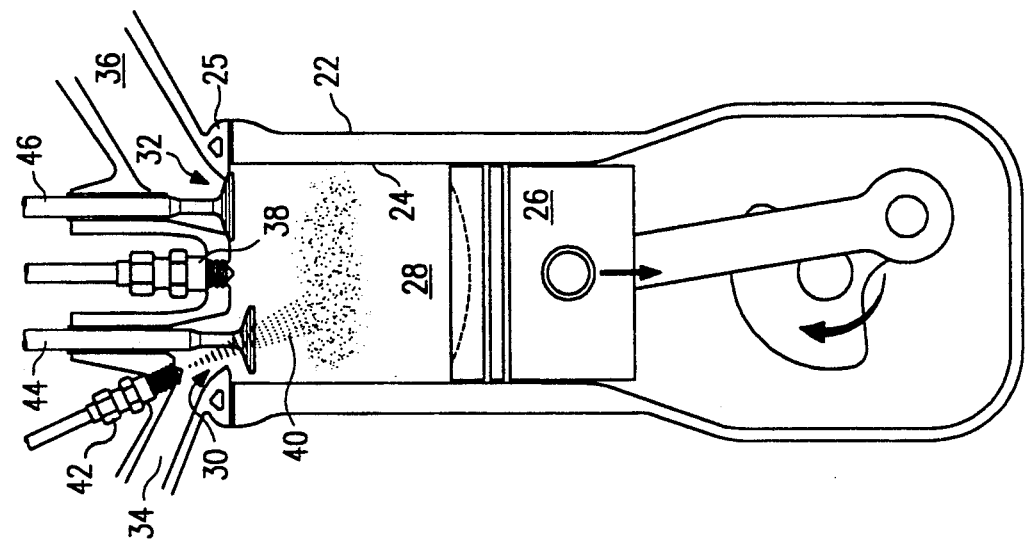
FIG. 4 is the cylinder and crankcase of FIG. 2 at the conclusion of the compression stroke, showing injection of the main fuel charge through the high pressure fuel injector.

Near the conclusion of the compression stroke when the piston 26 is near the top dead center position, the main fuel charge 48 is injected into the combustion chamber 28 through the high pressure fuel injection nozzle 38, as shown in FIG. 4. Preflame reaction of the pilot fuel charge 40 is still in progress when the main fuel charge 48 enters the combustion chamber. The mixture of pilot fuel charge 40 with air entrains the mail fuel charge 40 as it is injected.

The heat energy released by the preflame reaction of the pilot fuel charge 40 accelerates combustion of the main fuel charge 48. The ignition delay period and premix combustion rate for the main fuel charge 48 are thus reduced by this staged fuel injection process. For optimum performance with standard diesel fuel, the pilot fuel quantity should be 5% to 10% of the main fuel charge quantity. For a low centane number diesel fuel, the pilot fuel quantity may be increased in order to control the combustion for a lower rate of pressure rise.

Figure 5:
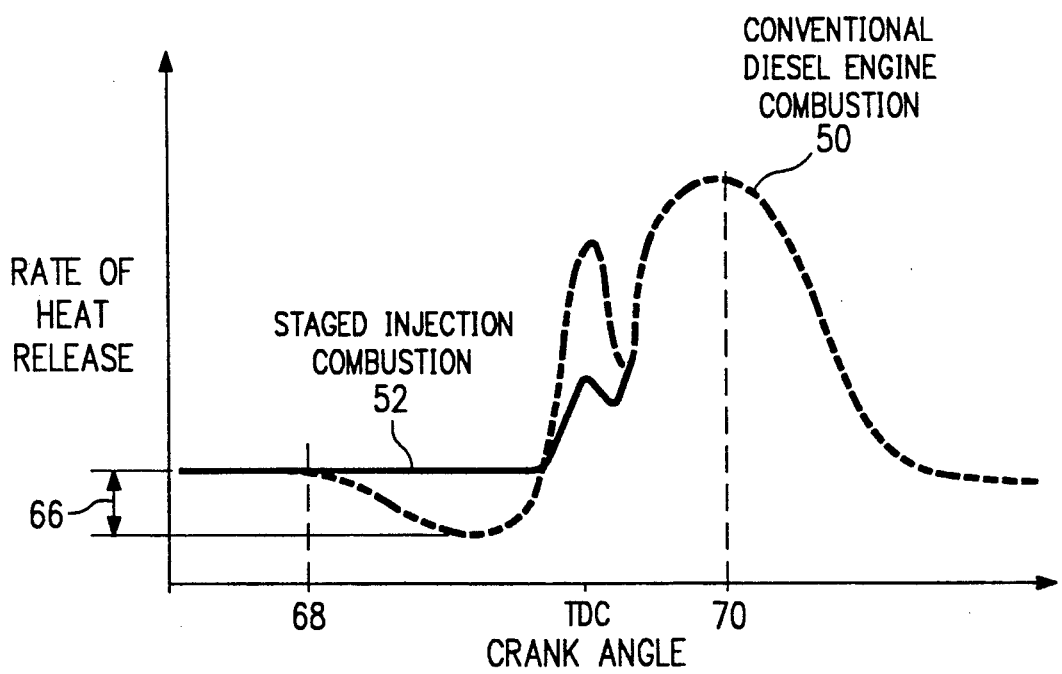
FIG. 5 is a graph depicting the rate of heat released in the combustion chamber as a function of crankshaft angular displacement during the later part of the compression stroke of the piston.

FIG. 5 illustrates the rate of heat released into the combustion chamber 28 as a function of crankshaft angular displacement from inception of the compression stroke of the piston, for both a conventional diesel engine of the prior art, and for a staged injection diesel engine 20 conforming to the invention. The compression stroke commences at piston bottom dead center (BDC) position, and ends at piston top dead center (TDC) position, as indicated on the crank angle axis of FIG. 5. The dashed line 50 represents the rate of heat release in a conventional diesel engine, without staged fuel injection, and the solid line 52 represents the rate of heat release in a staged injection engine incorporating the present invention. For the staged injection engine, the fuel injection period begins at 68 and terminates at 70 on the crank angle axis. The decrease in heat release rate 66 occurring shortly after the main fuel injection in the conventional engine is caused by heat transfer from the hot compressed air to the lower temperature fuel charge injected into the chamber.

This decrease in heat release rate does not occur in the staged injection engine, because the heat energy released by the preflame reaction of the pilot fuel charge 40 compensates for, or offsets, the heat absorbed by the main fuel charge 48 from the compressed air. Because the compressed air in the combustion chamber 28 loses less heat energy to the main fuel charge in the staged injection engine of the present invention, main fuel combustion is accelerated, and ignition delay and premix combustion rate are decreased, as compared to the conventional diesel engine without staged fuel injection.

Figure 8:
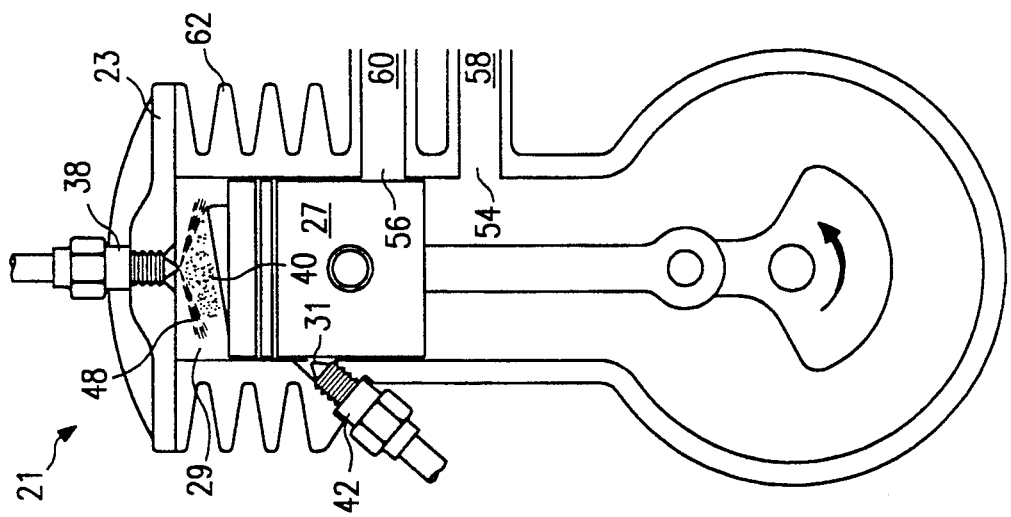
FIG. 8 is the cylinder and crankcase of FIG. 6 at the conclusion of the compression stroke, showing injection of the main fuel charge through the high pressure fuel injector.
Figure 7:
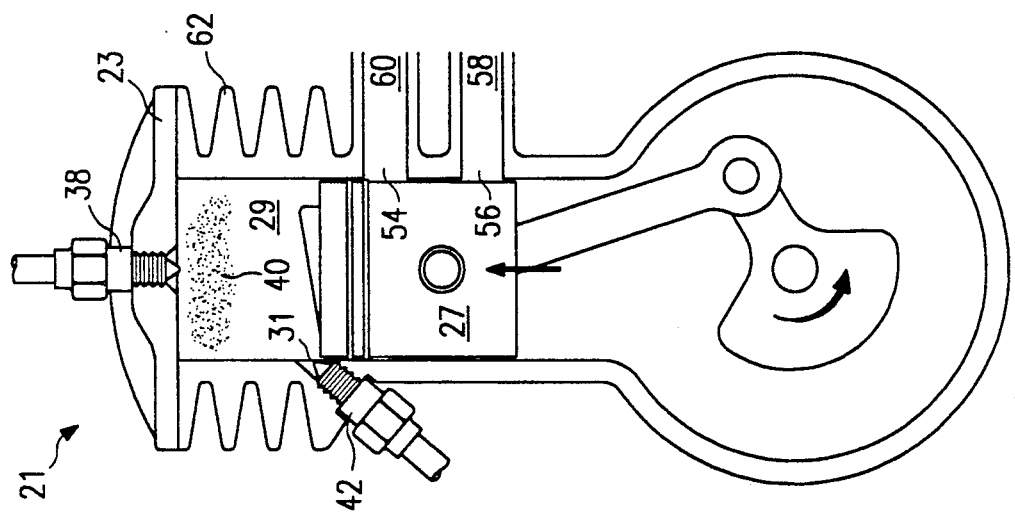
FIG. 7 is the cylinder and crankcase of FIG. 6 later during the compression stroke, showing the low pressure pilot fuel charge stratified in the combustion chamber.
Figure 6:
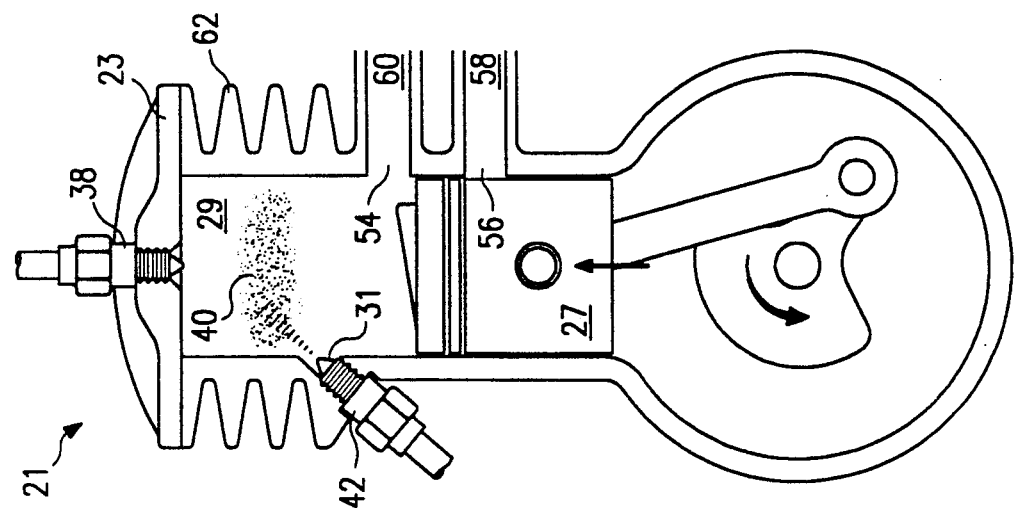
FIG. 6 is a side elevational view, partially in cross-section, of one cylinder and crankcase of a reciprocating 2-stroke compression-ignition internal combustion engine conforming with the invention, during the early part of the compression stroke, showing injection of a pilot fuel charge.

FIGS. 6-8 show a reciprocating 2-stroke compression-ignition internal combustion engine generally designated by the reference character 21 which incorporates the present invention. The 2-stroke engine 21 differs in the following material respects from the 4-stroke engine 20 described above. Inlet port 54 and scavenging port 56 are formed in the wall of combustion chamber 29, and open into inlet duct 58 and scavenging duct 60, respectively. The inlet and scavenging ports 54 and 56, respectively, are opened and closed by movement of piston 27, rather than by valves. The low pressure fuel injection nozzle 42 is positioned in a cylinder block 62 for injection of the pilot fuel charge 40 into the combustion chamber 29 through an opening 31 in the cylinder block 62. The high pressure fuel injection nozzle 38 is mounted in cylinder head 23, as in the case of the 4-stroke engine. In other respects, the 2-stroke engine 21 of the present invention is structurally similar to the 4-stroke engine 20.

In operation, as shown in FIG. 6, a pilot fuel charge 40 is injected through the low pressure fuel injection nozzle 42 during the early part of the compression stroke of the piston 27, when the volume of the combustion chamber 29 is near its maximum. Preferably, the pilot fuel charge 40 is injected immediately after scavaging port 56 has closed. As shown in FIG. 7, the pilot fuel charge 40 stratifies within the combustion chamber 29 as a result of the relatively low pressure environment in the chamber. During the ensuing compression stroke of the piston 27, the pilot fuel charge 40 undergoes a preflame reaction with an attendant release of heat energy, in the same manner as previously described for the 4-stroke engine 20.

Near the conclusion of the compression stroke, when the piston 27 is near top dead center position, the main fuel charge 48 is injected into the combustion chamber 29 through the high pressure fuel injection nozzle 38, as shown in FIG. 8. Combustion of the main fuel charge 48 is accelerated by the heat energy released by preflame reaction of the pilot fuel charge 40, in the manner previously described for the 4-stroke engine 20. The ignition delay period and premix combustion rate are thus reduced. The pilot fuel charge quantity in the case of the standard diesel fuel should preferably be 5% to 10% of the main fuel charge quantity, as in the case of the 4-stroke engine.

The primary advantages realized by the present invention, whether applied to the 4-stroke or the 2-stroke diesel engine, are: (1) a reduction in combustion noise and $NO_x$ emission without an attendant increase in either fuel consumption or particulate emissions; (2) low centane number diesel fuel can be used for both the pilot fuel and the main engine fuel, eliminating the requirements in previous dual injection engines for a second higher centane number fuel, second fuel tank, and associated fuel supply equipment; and (3) low cost adaptation to production is facilitated by use of a commercially available automotive type electronic fuel injector as the pilot fuel injection device. The invention's advantages over the staged injection engine disclosed by Baker in U.S. Pat. No. 4,543,930 derive from the fact that the pilot fuel is injected at a relatively low pressure compared to the pressure at which the main fuel is injected. Lower pressure injection of the pilot fuel achieves at least three advantages over high pressure injection. First, pilot fuel injected at low pressure creates less turbulence and does not mix as rapidly with the air in the combustion chamber; hence, stratification of the pilot fuel is facilitated. Second, fuel injected at low pressure is less likely to come in contact with the cylinder bore wall, or be trapped in quench regions of the combustion chamber, either of which events inhibits the preflame combustion process. Third, the fuel system of the invention is less complicated and less costly than that disclosed by Baker. Secondary advantages realized by the invention are: (1) lubrication of the intake valve and valve seat insert of the 4-stroke engine by the pilot fuel injection, and (2) decreased intake valve seat wear.

The reciprocating compression-ignition internal combustion engine of the present invention, and many of its intended advantages, will be understood from the foregoing description and it will be apparent that various changes may be made in the form, construction, and arrangement of the parts thereof without departing from the spirit and scope of the invention, or sacrificing all of its material advantages, the form hereinbefore described being merely a preferred or exemplary embodiment thereof.

What is claimed is:

1. An improved fuel system for use in a reciprocating compression ignition internal combustion engine that includes a cylinder block having a cylinder bore therein, a head closing one end of said bore, an inlet port and an exhaust port connected to said bore, a piston located for reciprocation in said bore, and a fuel supply, the fuel system comprising:

low pressure fuel injector means connected to said fuel supply for injecting a pilot fuel charge into said bore when said piston is located relatively remote from said head; and high pressure fuel injector means connected to said fuel supply for injecting a main fuel charge into said bore when said piston is proximate said head, whereby said pilot fuel charge is ignited by the heat of compression and, subsequently, ignites said main fuel charge during reciprocation of said piston.

2. The fuel system of claim 1 wherein said exhaust port is a scavenging port and said low pressure fuel injector means is located to inject said pilot fuel charge into said bore after said scavaging port has closed.

3. The fuel system of claim 1 wherein said low pressure fuel injector means is located to inject said pilot charge into said bore through said inlet port.

4. The fuel system of claim 3 wherein said engine has a valve moveable between positions closing and opening said inlet port and said low pressure fuel injector means is positioned to inject said pilot charge into said bore through said inlet port when said valve is in the open position.

5. A staged combustion process for a compression ignition internal combustion engine having a cylinder block, a cylinder bore in said block, a head closing one end of the bore, a piston located for reciprocation in the cylinder bore and cooperating with the cylinder block and head to define a combustion chamber, a fuel system for placing fuel into the combustion chamber, and inlet and exhaust ports, the process including the steps of:

moving the piston in the cylinder bore relatively away from said head;

injecting a pilot fuel charge at a first pressure into the cylinder bore when said piston is remote from said head;

moving the piston toward said head igniting said pilot fuel charge;

injecting a main fuel charge at a second pressure relatively higher than said first pressure into said combustion chamber when said piston is proximate said head; and igniting said main fuel charge.

6. The process of claim 5 wherein the main fuel charge is ignited by the burning of said pilot fuel charge.

7. The process of claim 5 wherein the step of igniting the main fuel charge occurs near top dead center position of said piston.

8. The process of claim 7 wherein the main fuel charge is ignited by the burning of said pilot fuel charge.

9. The combustion process of claim 5 wherein the injection of the pilot fuel charge occurs near bottom dead center location of said piston.

10. The combustion process of claim 9 wherein the pilot fuel charge is injected into said bore through the inlet port.

11. The combustion process of claim 9 wherein the exhaust port is a scavenging port and the pilot fuel charge is injected into said bore after said scavaging port has closed.

12. The combustion process of claim 9 wherein the injection of the main fuel charge occurs near top dead center location of said piston.

13. The process of claim 12 wherein the step of igniting the main fuel charge occurs near top dead center position of said piston.

14. The process of claim 13 wherein the main fuel charge is ignited by the burning of said pilot fuel charge.

15. A reciprocating 4-stroke compression-ignition internal combustion engine that includes a cylinder block having a cylinder bore therein, a cylinder head closing one end of said bore, a piston reciprocally movable in said cylinder bore to define a variable volume combustion chamber, inlet and exhaust ports connected to said cylinder bore, and a fuel system for placing fuel in the combustion chamber, the 4 strokes of said engine being an induction stroke, a compression stroke, a power stroke, and an exhaust stroke, said engine further including means for introducing a pilot fuel charge at a first pressure into said combustion chamber at a time between the later part of said induction stroke and the early part of said compression stroke of said engine, and for introducing a main fuel charge at a second pressure relatively higher than said first pressure into said combustion chamber near the end of said compression stroke, whereby said pilot fuel charge is stratified within the combustion chamber and undergoes a preflame chemical and physical reaction with a resultant release of heat energy before the main fuel discharge occurs, and whereby said release of heat energy accelerates combustion of the main fuel charge to reduce the ignition delay period and rate of premix combustion of said main fuel charge.

16. The internal combustion engine of claim 15, wherein said means for introducing said pilot fuel charge into said combustion chamber is an automotive type electronic fuel injector.

17. The internal combustion engine of claim 15, wherein said pilot fuel charge injection means is located to introduce said pilot fuel charge into said combustion chamber through said inlet port.

18. The internal combustion engine of claim 15, in which both the main fuel and the pilot fuel supplied to said engine are identical, and are supplied from a common fuel tank.

19. The internal combustion engine of claim 15, in which ordinary diesel fuel is used for both the main and pilot fuels.

20. The internal combustion engine of claim 15, further comprising a plurality of cylinder bores and pistons, a combustion chamber in each cylinder bore, and each combustion chamber receiving fuel from a separate pilot fuel injection device and a separate main fuel injection device.

21. The internal combustion engine of claim 15, in which the quantity of fuel in each pilot fuel charge is 5% to 10% by volume of the fuel in each main fuel charge introduced into said combustion chamber.

22. A reciprocating 2-stroke compression-ignition internal combustion engine that includes a cylinder block having a cylinder bore therein, a cylinder head closing one end of said bore, a piston reciprocally movable in said cylinder bore to define a variable volume combustion chamber, inlet and exhaust ports connected to said cylinder bore, and a fuel system for placing fuel in the combustion chamber, the 2 strokes of said engine being an expansion stroke and a compression stroke, and said engine further including means for introducing a pilot fuel charge at a first pressure into said combustion chamber during the early part of said compression stroke of said engine and for introducing a main fuel charge at a second pressure relatively higher than said first pressure into said combustion chamber near the end of said compression stroke, whereby said pilot fuel charge is stratified within the combustion chamber and undergoes a preflame chemical and physical reaction with a resultant release of heat energy before the main fuel discharge occurs, and whereby said release of heat energy accelerates combustion of the main fuel charge to reduce the ignition delay period and rate of premix combustion of said main fuel charge.

23. The internal combustion engine of claim 22, in which said means for introducing said pilot fuel charge into said combustion chamber is an automotive type electronic fuel injector.

24. The internal combustion engine of claim 22, wherein said means for introducing said pilot fuel charge is located to introduce said pilot fuel charge into said combustion chamber after said exhaust port has closed.

25. The internal combustion engine of claim 22, in which both the main fuel and the pilot fuel supplied to said engine are identical, and are supplied from a common fuel tank.

26. The internal combustion engine of claim 22, in which ordinary diesel fuel is used for both the main and pilot fuels.

27. The internal combustion engine of claim 22, further comprising a plurality of cylinder bores and pistons, a combustion chamber in each cylinder bore, and each combustion chamber receiving fuel from a separate pilot fuel injection device and a separate main fuel injection device.

28. The internal combustion engine of claim 22, in which the quantity of fuel in each pilot fuel charge is 5% to 10% by volume of the fuel in each main fuel charge introduced into said combustion chamber.

29. A method of operating a reciprocating 4-stroke compression ignition internal combustion engine that includes a cylinder block having a bore therein, a head closing one end of said bore, a piston reciprocally movable in said cylinder bore to define a variable volume combustion chamber, inlet and exhaust ports connected to said cylinder bore, and a fuel system for placing fuel in the combustion chamber, the 4 strokes of said engine being an induction stroke, a compression stroke, a power stroke, and an exhaust stroke, the method comprising the steps of:
  injecting a pilot fuel charge at a first pressure into said combustion chamber at a time between the later part of said induction stroke and the early part of said compression stroke of said engine;
  compressing said pilot fuel charge during the compression stroke of said engine;
  igniting said pilot fuel charge by the heat of said compression;
  injecting a main fuel charge at a second pressure relatively higher than said first pressure into said combustion chamber near the conclusion of said compression stroke; and
  igniting said main fuel charge by the heat associated with said ignited pilot fuel charge.

30. A method of operating a reciprocating 2-stroke compression ignition internal combustion engine that includes a cylinder block having a bore therein, a head closing one end of said bore, a piston reciprocally movable in said cylinder bore to define a variable volume combustion chamber, inlet and exhaust ports connected to said cylinder bore, and a fuel system for placing fuel in the combustion chamber, the two strokes of said engine being an expansion stroke and a compression stroke, the method comprising the steps of:
  injecting a pilot fuel charge at a first pressure into said combustion chamber during the early part of said compression stroke of said engine;
  compressing said pilot fuel charge during the remainder of said compression stroke of said engine;
  igniting said pilot fuel charge by the heat of said compression;
  injecting a main fuel charge at a second pressure relatively higher than said first pressure into said combustion chamber near the conclusion of said compression stroke; and
  igniting said main fuel charge by the heat associated with said ignited pilot fuel charge.

31. The method of operating an internal combustion engine in claim 30, wherein said pilot fuel charge is injected into said combustion chamber during the early part of said compression stroke, and immediately after said exhaust port has closed.

32. An apparatus for reducing ignition delay and for controlling premix combustion rate in a reciprocating 4-stroke compression ignition internal combustion engine that includes a cylinder block having a cylinder bore therein, a head closing one end of said bore, a piston reciprocally movable in said cylinder bore to define a variable volume combustion chamber, inlet and exhaust ports connected to said cylinder bore, and a fuel system for injecting a main fuel charge at a first pressure into said combustion chamber, the 4 strokes of said engine being an induction stroke, a compression stroke, a power stroke, and an exhaust stroke, said apparatus consisting of means for introducing a pilot fuel charge at a second pressure relatively lower than said first pressure into said combustion chamber at a time between the later part of said induction stroke and the early part of said compression stroke of said engine, whereby said pilot fuel charge is stratified within the combustion chamber and undergoes a preflame chemical and physical reaction with a resultant release of heat energy before each main fuel injection occurs, and whereby said release of heat energy accelerates combustion of the main fuel charge.

33. The apparatus of claim 32, wherein said means for introducing said pilot fuel charge into said combustion chamber consists of an automotive type electronic fuel injector.

34. The apparatus of claim 32, wherein said pilot fuel charge injection means is located to introduce said pilot fuel charge into said combustion chamber through said inlet port.

35. The apparatus of claim 32, in which both the main fuel and the pilot fuel supplied to said engine are identical, and are supplied from a common fuel tank.

36. The apparatus of claim 32, in which ordinary diesel fuel is used for both the main and pilot fuels.

37. The apparatus of claim 32 further comprising a plurality of cylinder bores and pistons, a combustion chamber in each cylinder bore, and each combustion chamber receiving fuel from a separate pilot fuel injection device and a separate main fuel injection device.

38. The apparatus of claim 32, in which the quantity of fuel in each pilot fuel charge is 5% to 10% by volume of the fuel in each main fuel charge introduced into said combustion chamber.

39. An apparatus for reducing ignition delay and for controlling premix combustion rate in a reciprocating 2-stroke compression ignition internal combustion engine that includes a cylinder block having a cylinder bore therein, a head closing one end of said bore, a piston reciprocally movable in said cylinder bore to define a variable volume combustion chamber, inlet and exhaust ports connected to said cylinder bore, and a fuel system for injecting a main fuel charge at a first pressure into said combustion chamber, the 2 strokes of said engine being an expansion stroke and a compression stroke, said apparatus consisting of means for introducing a pilot fuel charge at a second pressure relatively lower than said first pressure into said combustion chamber during the early part of said compression stroke of said engine, whereby said pilot fuel charge is stratified within the combustion chamber and undergoes a preflame chemical and physical reaction with a resultant release of heat energy before each main fuel injection occurs, and whereby said release of heat energy accelerates combustion of the main fuel charge.

40. The apparatus of claim 39, wherein said means for introducing said pilot fuel charge into said combustion chamber consists of an automotive type electronic fuel injector.

41. The apparatus of claim 39, wherein said pilot fuel charge injection means is located to introduce said pilot fuel charge into said combustion chamber after said exhaust port has closed.

42. The apparatus of claim 39, in which both the main fuel and the pilot fuel supplied to said engine are identical, and are supplied from a common fuel tank.

43. The apparatus of claim 39, in Which ordinary diesel fuel is used for both the main and pilot fuels.

44. The apparatus of claim 39 further comprising a plurality of cylinder bores and pistons, a combustion chamber in each cylinder bore, and each combustion chamber receiving fuel from a separate pilot fuel injection device and a separate main fuel injection device.

45. The apparatus of claim 39, in which the quantity of fuel in each pilot fuel charge is 5% to 10% by volume of the fuel in each main fuel charge introduced into said combustion chamber.

46. A fuel injection device for use with a reciprocating 4-stroke compression-ignition internal combustion engine that includes a cylinder block having a cylinder bore therein, a head closing one end of said bore, a piston reciprocally movable in said cylinder bore to define a variable volume combustion chamber, inlet and exhaust ports connected to said cylinder bore, and a fuel system for injecting a main fuel charge at a first pressure into the combustion chamber, the 4-strokes of said engine being an induction stroke, a compression stroke, a power stroke, and an exhaust stroke, said fuel injection device comprising the combination of a fuel injection nozzle leading into said combustion chamber, and means for injecting a pilot fuel charge at a second pressure relatively lower than said first pressure through the injection nozzle at a time between the later part of said induction stroke and the early part of said compression stroke of said engine, whereby said pilot fuel charge is stratified within the combustion chamber and undergoes a preflame chemical and physical reaction with a resultant release of heat energy before said main fuel discharge occurs, and whereby said release of heat energy accelerates combustion of said main fuel charge.

47. The fuel injection device of claim 46, wherein said means for injecting said pilot fuel charge through said injection nozzle consists of an automotive type electronic fuel injector.

48. The fuel injection device of claim 46, wherein said pilot fuel charge injection means is located to introduce said pilot fuel charge into said combustion chamber through said inlet port.

49. The fuel injection device of claim 46, in which both the main fuel and the pilot fuel supplied to said engine are identical, and are supplied from a common fuel tank.

50. The fuel injection device of claim 46, in which ordinary diesel fuel is used for both the main and pilot fuels.

51. The fuel injection device of claim 46, further comprising a plurality of cylinder bores and pistons, a combustion chamber in each cylinder bore, and each combustion chamber receiving fuel from a separate pilot fuel injection device and a separate main fuel injection device.

52. The fuel injection device of claim 46, in which the quantity of fuel in each pilot fuel charge is 5% to 10% by volume of the fuel in each main fuel charge introduced into said combustion chamber.

53. A fuel injection device for use with a reciprocating 2-stroke compression-ignition internal combustion engine that includes a cylinder block having a cylinder bore therein, a head closing one end of said bore, a piston reciprocally movable in said cylinder bore to define a variable volume combustion chamber, inlet and exhaust ports connected to said cylinder bore, and a fuel system for injecting a main fuel charge at a first pressure into the combustion chamber, the 2 strokes of said engine being an expansion stroke and a compression stroke, said fuel injection device comprising the combination of a fuel injection nozzle leading into said combustion chamber, and means for injecting a pilot fuel charge at a second pressure relatively lower than said first pressure through the injection nozzle in the early part of said compression stroke of said engine, whereby said pilot fuel charge is stratified within the combustion chamber and undergoes a preflame chemical and physical reaction with a resultant release of heat energy before said main fuel discharge occurs, and whereby said release of heat energy accelerates combustion of said main fuel charge.

54. The fuel injection device of claim 53, wherein said means for injecting said pilot fuel charge through said injection nozzle consists of an automotive type electronic fuel injector.

55. The fuel injection device of claim 53, wherein said pilot fuel charge injection means is located to introduce said pilot fuel charge into said combustion chamber after said exhaust port has closed.

56. The fuel injection device of claim 53, in Which both the main fuel and the pilot fuel supplied to said engine are identical, and are supplied from a common fuel tank.

57. The fuel injection device of claim 53, in which ordinary diesel fuel is used for both the main and pilot fuels.

58. The fuel injection device of claim 53, further comprising a plurality of cylinder bores and pistons, a combustion chamber in each cylinder bore, and each combustion chamber receiving fuel from a separate pilot fuel injection device and a separate main fuel injection device.

59. The fuel injection device of claim 53, in which the quantity of fuel in each pilot fuel charge is 5% to 10% by volume of the fuel in each main fuel charge introduced into said combustion chamber.

* * * * *

UNITED STATES PATENT AND TRADEMARK OFFICE
CERTIFICATE OF CORRECTION

PATENT NO. : 5,119,780
DATED : June 9, 1992
INVENTOR(S) : Susumu Ariga

It is certified that error appears in the above-identified patent and that said Letters Patent is hereby corrected as shown below:

Column 6, line 3, after "the" second occurrence, delete ",".

Column 11, Claim 43, line 42, after "in" delete "Which" and insert -- which --.

Column 12, Claim 56, line 65, after "in" delete "Which" and insert -- which --.

Signed and Sealed this

Fifth Day of October, 1993

Attest:

BRUCE LEHMAN

*Attesting Officer*     *Commissioner of Patents and Trademarks*